J. T. FITCH.
VEHICLE TIRE.
APPLICATION FILED MAY 26, 1915.
1,178,790.
Patented Apr. 11, 1916.
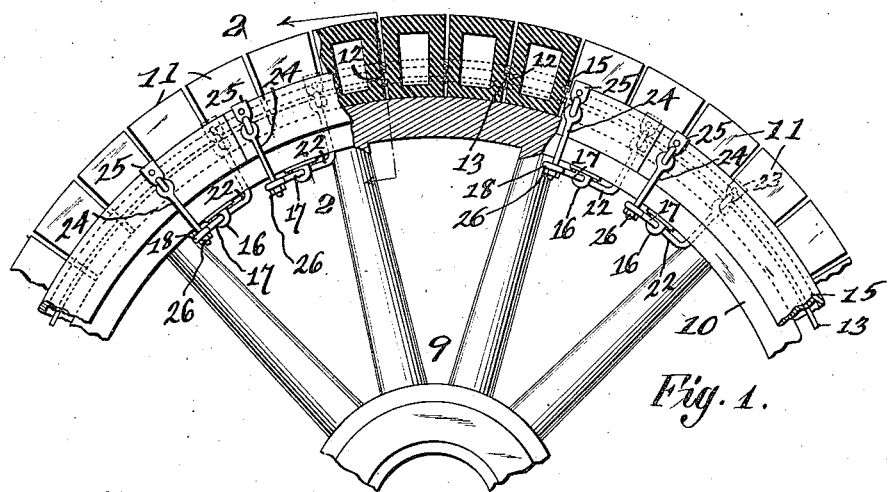
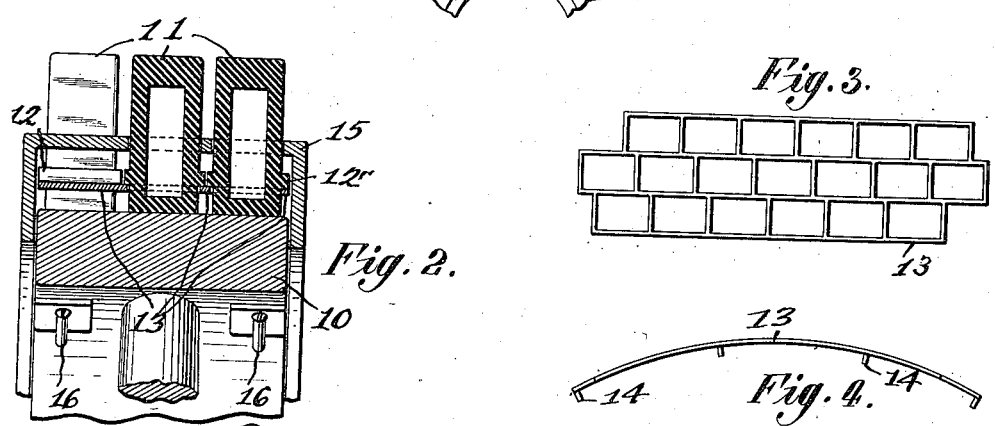
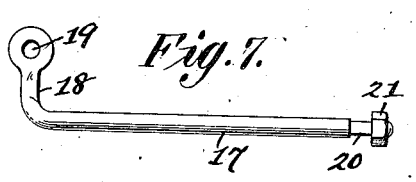
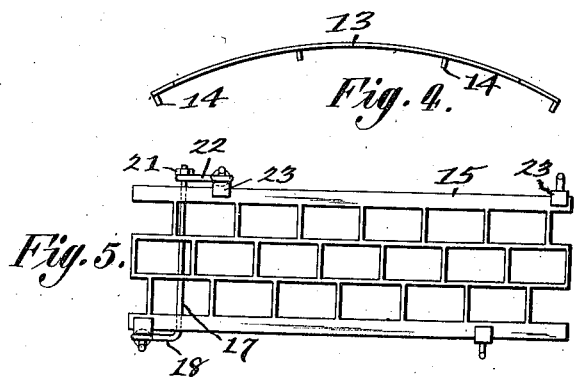
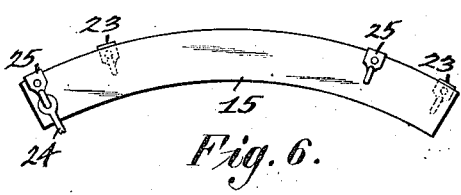
WITNESSES
Fred. Roegen
J. C. Larsen
INVENTOR
J. T. Fitch
BY Munn & Co.
ATTORNEYS

UNITED STATES PATENT OFFICE.

JOHN THOMAS FITCH, OF HELPER, UTAH.

VEHICLE-TIRE.

1,178,790.

Specification of Letters Patent. Patented Apr. 11, 1916.

Application filed May 26, 1915. Serial No. 30,512.

*To all whom it may concern:*

Be it known that I, JOHN T. FITCH, a citizen of the United States, and a resident of Helper, in the county of Carbon and State of Utah, have invented certain new and useful Improvements in Vehicle-Tires, of which the following is a specification.

My invention relates to tires for vehicles, particularly motor driven vehicles, and one of the main objects thereof is to provide a substitute for the conventional pneumatic tire which is of no greater initial cost, of very low maintenance cost, which prevents accidents now due to blow-outs, which enables repair of any required portion of the tire without removing the tire entirely from a wheel, and which possesses all the advantages of the pneumatic tire without any of its disadvantages.

The invention is fully described in the following specification, of which the accompanying drawings form a part, in which like reference characters refer to like parts in each of the views, and in which:—

Figure 1 is a fragmentary side elevation of a wheel provided with my invention, partly in section; Fig. 2 is an enlarged section taken on the line 2—2 of Fig. 1; Fig. 3 is a face view of a section of a spacing rim which I employ; Fig. 4 is a side view thereof; Fig. 5 is a face view of a frame section with the means for holding the same to a wheel; Fig. 6 is a side view of Fig. 5; Fig. 7 is a detached view of one member of a lock which I employ; and Fig. 8 is a detached view of a complemental member.

In the drawings forming a part of this application I have shown one embodiment of my invention mounted upon a wheel 9 having the usual or any desired felly 10, said tire consisting of a plurality of resilient blocks 11 resting upon said felly in close relationship in either one or a plurality of circumferential rows, three being illustrated. These may be hollow as shown according to the type of vehicle upon which their use is intended, and, if so they may be inflated with air under pressure, no means being shown, however, for such inflation as this may be accomplished in the manufacture of the blocks, the air pressure being previously calculated for the estimated load; this inflated form will be better adapted for pleasure vehicles, than the conventional solid form as now used on trucks. These blocks have, each, a projecting flange 12 on each side thereof to provide inner and outer shoulders on the four sides, the former for an inner rim formed of a plurality of arcuate sections 13 having a plurality of spaces therein of the size of and adapted to receive the blocks 11 at their inner ends so that the inner shoulders bear on the rim sections in the positions of the respective spaces, this being clearly shown in Figs. 1 and 2, and it will be seen that the blocks are thus positioned in spaced relationship. This rim may be made of one piece entirely encircling the felly 10 and legs or spacers 14 are provided on the inner side thereof to maintain the same in spaced relationship with the felly.

With the rim 13 in place, the blocks may be inserted into the respective spaces thereof and, if the dimensions of said blocks are correct, said blocks will be held in place by frictional contact with the rim to allow the installation of the means for locking said blocks in position. This means includes an outer rim 15 composed of a plurality of arcuate sections of inverted channel form in cross-section, as shown in Fig. 2, and provided with complemental spaces therein registering with the spaces in the rim 13 through which the respective blocks 11 are passed, the length of these sections of the rim 15 being such as to enable the installation thereof over said blocks and, when the rim 15 is in place, the blocks are held against radial, lateral, or circumferential, displacement with respect to the felly 10.

To anchor each of the sections of the rim 15 in place I provide staples 16 on the inner surface of the felly which are adapted to receive a laterally arranged bolt 17 having an angular extension 18 provided with a eye 19 at one end and with a reduced, angular in cross-section, axial extension 20 having a threaded end to receive a nut 21, the eye 19 being approximately on one side of the wheel and the axial extension 20 being on the other side of said wheel, and the bolt or rod 17 being arranged transversely of the felly and rotatable in the staples 16.

Held against rotation on the axial extension 20 is an angular hook 22 which is in detachable engagement with a hook-eye 23 bearing on the outer periphery of the rim 15 on the inner side of the wheel, the outward strain on the eye end of the rod 17 tending to draw the respective section of the rim 15 inwardly of the wheel on the corresponding side thereof.

Passed inwardly through the eye 19 is an eye-bolt 24 which is engaged at its eye end with a hook-eye 25 similar to the hook-eye 23 and bears on the outer periphery of the rim 15 on the outer side of the wheel, a nut 26 serving to draw the section of the rim 15 on this side of the wheel to lock said rim section to the felly and lock the blocks 11 in position.

When the nut 26 is removed from the eye-bolt 24, the hook-eye 25 may be removed from the respective rim section, thus permitting rotation of the rod 17 in its supporting staples, whereby the hook-eye 23 may be removed from the said rim section to permit the removal of the latter to remove one or more blocks 11 for repair or to substitute others therefor, this taking but an instant, as will be seen.

It will thus be seen that I provide a tire which is composed of a plurality of distinct units arranged in one row if desired or in a plurality of rows, as shown, and it will be noted that, in the latter case, the blocks are staggered with respect to each other in order to prevent wear of the laterally arranged ones at the same points; this unit construction enables quick and inexpensive repair to any necessary point on a tire without affecting the remainder thereof and, while the initial cost of my tire will be no greater than that of a conventional pneumatic tire, the upkeep cost will be very low.

The blocks may be made solid or hollow, in the latter case containing air under atmospheric or other pressure, and the resiliency of a pneumatic tire may be equaled by my tire according to the degree of resiliency of the rubber or other material of which my blocks are composed.

While I have shown a preferred form of block, and preferred means for holding them in place, I do not confine myself thereto, but may make changes thereover, within the scope of the following claims, without departing from the spirit of my invention or sacrificing its advantages.

Having fully described my invention, what I claim as new, and desire to secure by Letters Patent, is:—

1. The combination with the felly of a wheel, of a spacing rim provided with a plurality of openings therethrough, means for holding the same at a distance from said felly, a locking rim provided with openings in register with the respective openings in said spacing rim, a tread block in the respective openings in both rims bearing on said felly and provided with a flange intermediate the height thereof imprisoned between said rims, and means for holding said rims to said felly.

2. The combination with a felly of a wheel, of a spacing rim provided with a plurality of openings therethrough, legs for holding the same at a distance from said felly, a locking rim provided with openings in register with the respective openings in said spacing rim, a tread block in the respective openings of both rims bearing on said felly and provided with a flange intermediate the height thereof imprisoned between said rims, and means for holding said rims to said felly.

3. The combination with the felly of a wheel, of a spacing rim provided with a plurality of openings therethrough, means for holding the same at a distance from said felly, a locking rim provided with a plurality of openings in register with the respective openings of said spacing rim and with radially directed flanges bearing on the sides of said felly, a tread block in the respective openings of both rims bearing on said felly and provided with a flange intermediate the height thereof imprisoned between said rims, and means for holding said rims to said felly.

4. The combination with the felly of a wheel, of a spacing rim provided with a plurality of openings therethrough, means for holding the same at a distance from said felly, a locking rim provided with openings in register with the respective openings of said spacing rim, a tread block in the respective openings of both rims bearing on said felly and provided with a flange intermediate the height thereof imprisoned between said rims, a hook-eye engaged with said locking rim at one side of said felly, a supplemental hook-eye engaged with said locking rim at the other side of said felly, a transverse rod rotatably held on the inner surface of said felly and provided with oppositely directed arms, and means for connecting each of said arms with the respective hook-eye.

In testimony whereof I have signed my name to this specification in the presence of two subscribing witnesses.

JOHN THOMAS FITCH.

Witnesses:
MARGARET AUDSLEY,
T. C. SMILEY.